(12) United States Patent
Chang et al.

(10) Patent No.: US 10,266,059 B1
(45) Date of Patent: Apr. 23, 2019

(54) INDUSTRIAL SOCKET

(71) Applicants: SOLTEAM ELECTRONICS (DONG GUAN) CO., LTD., Dong Guan (CN); SOLTEAM ELECTRONICS (SU ZHOU) CO., LTD., Wu Jiang (CN); SOLTEAM ELECTRONICS CO., LTD., Taoyuan (TW)

(72) Inventors: Chun-Yun Chang, Taoyuan (TW); Cheng-Wei Lu, Taoyuan (TW); Chi-Han Huang, Taoyuan (TW); Ta-Feng Yeh, New Taipei (TW); Ying-Sung Ho, Hsinchu County (TW)

(73) Assignees: SOLTEAM ELECTRONICS (DONG GUAN) CO., LTD. (CN); SOLTEAM ELECTRONICS (SU ZHOU) CO., LTD. (CN); SOLTEAM ELECTRONICS CO., LTD. (TW)

( * ) Notice: Subject to any disclaimer, the term of this patent is extended or adjusted under 35 U.S.C. 154(b) by 0 days.

(21) Appl. No.: 16/053,904

(22) Filed: Aug. 3, 2018

(30) Foreign Application Priority Data

Jul. 12, 2018 (CN) .......................... 2018 1 0762510

(51) Int. Cl.
| | | |
|---|---|---|
| H01R 13/52 | (2006.01) | |
| B60L 11/18 | (2006.01) | |
| H01R 13/502 | (2006.01) | |
| H01R 13/642 | (2006.01) | |
| H01R 24/28 | (2011.01) | |
| H01R 13/629 | (2006.01) | |
| H01R 13/44 | (2006.01) | |

(52) U.S. Cl.
CPC ........ *B60L 11/1818* (2013.01); *H01R 13/502* (2013.01); *H01R 13/52* (2013.01); *H01R 13/629* (2013.01); *H01R 13/642* (2013.01); *H01R 24/28* (2013.01); *H01R 2201/26* (2013.01)

(58) Field of Classification Search
CPC .. H01R 13/502; H01R 13/629; H01R 13/642; H01R 13/52; H01R 24/28
See application file for complete search history.

(56) References Cited

U.S. PATENT DOCUMENTS

| | | | |
|---|---|---|---|
| 7,104,818 B1 * | 9/2006 | Chang .................. | H01R 13/629 439/137 |
| 9,455,522 B1 * | 9/2016 | Ghannam .......... | H01R 13/5202 |
| 9,496,696 B2 * | 11/2016 | Bulancea ................. | H02G 3/14 |
| 9,647,376 B2 * | 5/2017 | Samojeden ........ | H01R 13/4536 |

\* cited by examiner

*Primary Examiner* — Xuong M Chung Trans

(57) ABSTRACT

Disclosures of the present invention describe an industrial socket, comprising: an insulation body, a plurality of electrical connectors, a plurality of actuating units, and a plurality of elastic elements, wherein each of the actuating units comprises a slant surface portion and a cover portion. It is worth explaining that, when an electrical plug is inserted into a receiving opening of the insulation body, the slant surface portion enters a notch by a pushing force applied by the electrical plug, such that the cover portion correspondingly moves with the motion of the slant surface portion, so as to stop the shielding to an electrical end of the electrical connector. Therefore, this novel industrial socket has many outstanding functions of fool-proof, dustproof and contact protection.

10 Claims, 9 Drawing Sheets

INDUSTRIAL SOCKET

BACKGROUND OF THE INVENTION

1. Field of the Invention

The present invention relates to technology filed of electrical connectors, and more particularly to an industrial socket having a contact terminal protecting design.

2. Description of the Prior Art

With popularization of personal vehicles, straddle-type electric vehicles, and electric vehicles, industrial sockets are getting more and broader applications. However, some of the commercial industrial sockets for use in electric vehicles do not have particular designs for achieving dustproof and protection of contact terminal, such that external dust can easily enter and accumulate in those industrial sockets. It is presumed that the accumulated dust must causes quite influence on charging performance and charging safety of the electric vehicles. For instance, when an industrial socket having a large amount of accumulated dust therein is used for charging an electric vehicle's battery, there may has an unexpected abrupt increase of temperature occurring in the industrial socket. Seriously, the abruptly-increased temperature may further lead the industrial socket to be subject to spontaneous combustion.

Accordingly, industrial socket manufacturer provides an industrial socket with dustproof design. FIG. 1 shows a stereo view of a conventional industrial socket. As shown in FIG. 1, the conventional industrial socket 1' comprises: an insulation body 10', a plurality of electrical connectors 11' disposed in the insulation body 10', and a protective cover 12'. It is noted that, when the industrial socket 1' does not receive a corresponding electrical plug by a receiving opening thereof, the protective cover 12' is configured to shield the receiving opening of the insulation body 10', so as to prevent the dust from entering the insulation body 10'. However, in the case of the fact that the receiving opening does not be covered by the protective cover 12' after a battery charging procedure is completed, the dust still may be able to enter the insulation body 10' through the receiving opening.

Through above descriptions, it is known that the conventional industrial socket 1' still shows drawbacks and shortcomings in practical use. In view of that, inventors of the present application have made great efforts to make inventive research thereon and eventually provided an industrial socket.

SUMMARY OF THE INVENTION

The primary objective of the present invention is to provide an industrial socket, comprising: an insulation body, a plurality of electrical connectors, a plurality of actuating units, and a plurality of elastic elements, wherein each of the plurality actuating units comprises a slant surface portion and a cover portion, the insulation body has an accommodating space with a receiving opening and a plurality of notch formed on the inner wall of the accommodating space, and each of the electrical connectors has a sidewall aperture. It is worth explaining that, when there are no external forces being applied to the industrial socket, each of the plurality of cover portions are configured to protrude out of the corresponding sidewall aperture thereof so as to be positioned to shield a first electrical end of each of the plurality of electrical connectors. On the contrary, when an electrical plug is inserted into the receiving opening of the insulation body, each of the plurality of slant surface portions enters the corresponding notch in the accommodating space by a pushing force applied by the electrical plug, such that the cover portion correspondingly moves with the motion of the slant surface portion, so as to stop the shielding to the first electrical end of the electrical connector. Therefore, this novel industrial socket has many outstanding functions of fool-proof, dustproof and contact protection.

For achieving the primary objective of the present invention, the inventor of the present invention provides an embodiment for the industrial socket, comprising:

an insulation body, having an accommodating space with a receiving opening and a plurality of notch formed on the inner wall of the accommodating space;

a plurality of electrical connectors, being disposed in the accommodating space and having a first electrical end;

a plurality of actuating units, being pivotally connected to the inner wall of the accommodating space and positioned around the receiving opening; wherein each of the actuating units comprises a slant surface portion and a cover portion, and the cover portion shielding the first electrical end; and a plurality of elastic elements, being disposed in the insulation body, wherein each of the plurality of elastic elements is located between the inner wall of case and one corresponding actuating unit;

wherein, when an electrical plug is inserted into the receiving opening, the slant surface portion enters the corresponding notch by a pushing force applied by the electrical plug, such that the cover portion correspondingly moves with the motion of the slant surface portion, so as to stop the shielding to the first electrical end of the electrical connectors, therefore a plurality of electrical terminals of the electrical plug are respectively electrically connected to the first electrical ends of the electrical connectors.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an industrial socket, embodiments of the present invention will be described in detail with reference to the attached drawings hereinafter.

Figure 1:
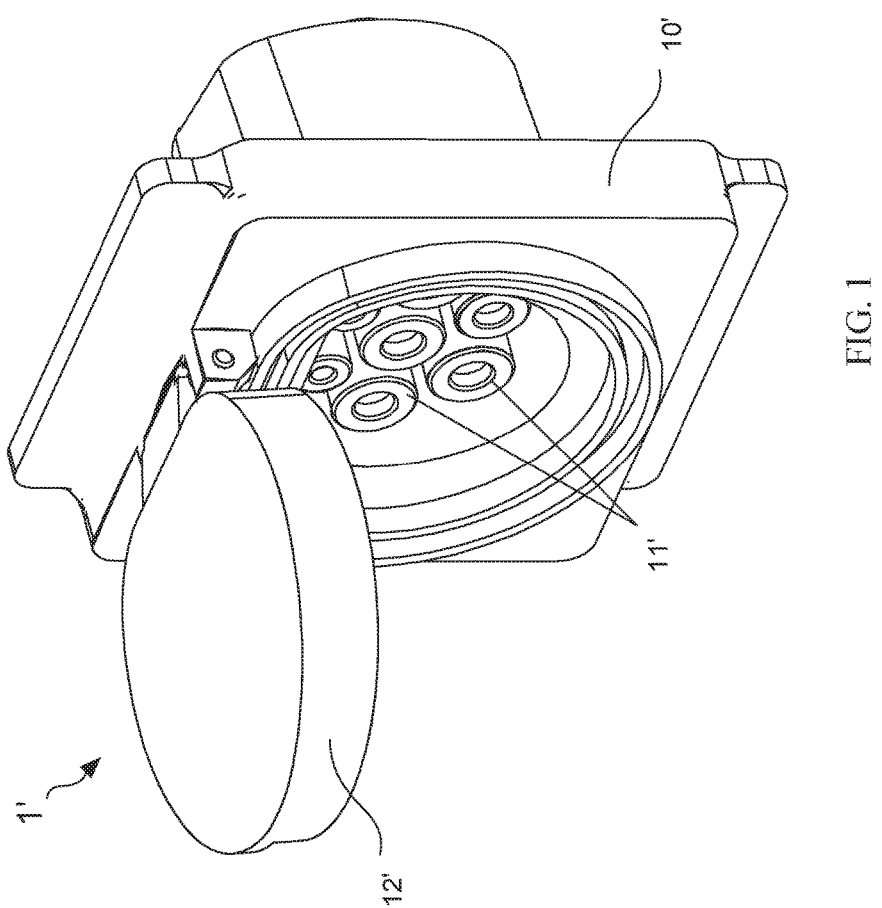
FIG. 1 shows a stereo diagram of a conventional industrial socket.
Figure 2:
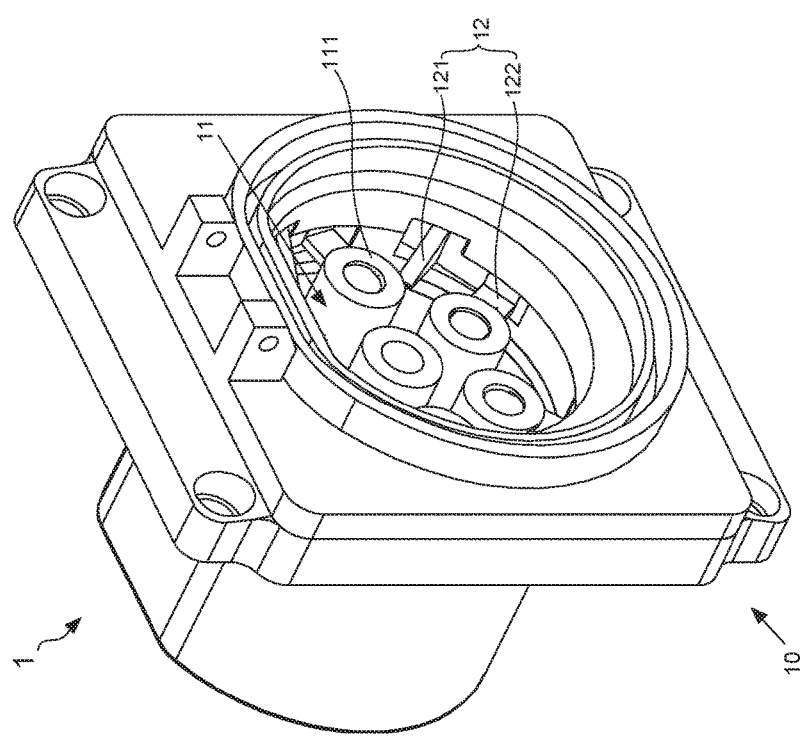
FIG. 2 shows a first stereo diagram of an industrial socket according to the present invention.
Figure 3:
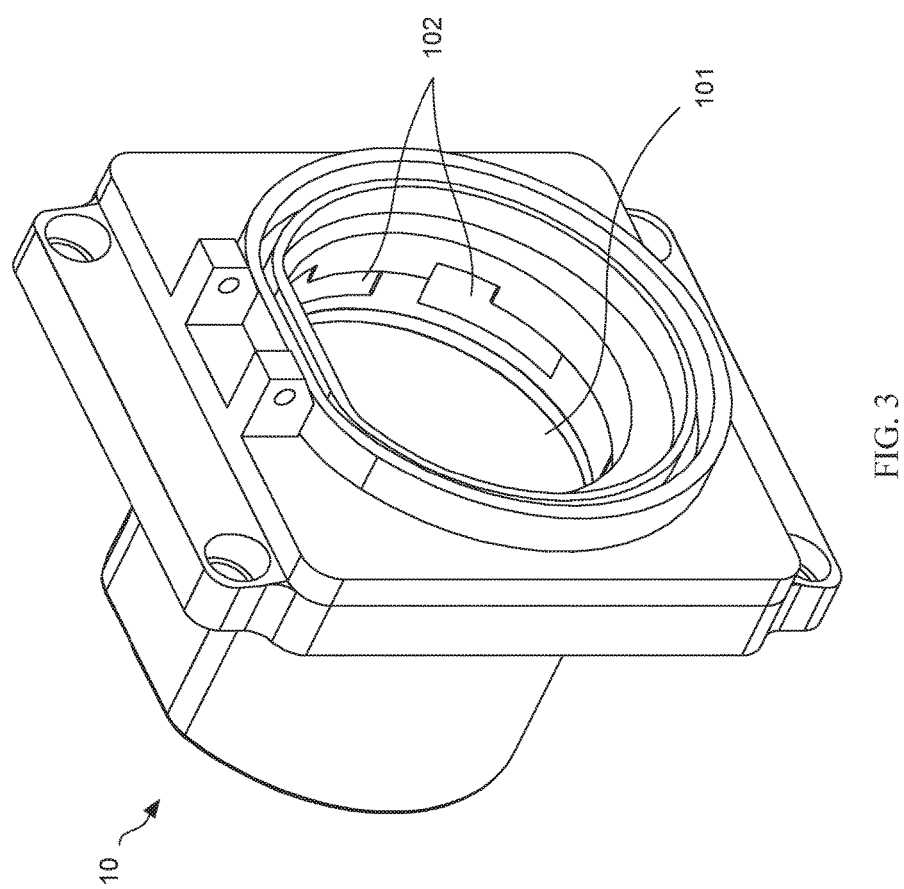
FIG. 3 shows a stereo view of an insulation body.

With reference to FIG. 2, there is provided a stereo diagram of an industrial socket according to the present invention. Moreover, FIG. 3 shows a stereo view of an insulation body of the industrial socket. As FIG. 2 and FIG. 3 show, the industrial socket 1 of the present invention mainly comprises: an insulation body 10, a plurality of electrical connectors 11, a plurality of actuating units 12, and a plurality of elastic elements 13, wherein the insulation body 10 has an accommodating space with a receiving opening 101 and a plurality of notch 102 formed on the inner wall of the accommodating space. Besides, the electrical connectors 11 are disposed in the accommodating space and have a first electrical end. Moreover, the actuating units 12 are pivotally connected to the inner wall of the accommodating space and positioned around the receiving opening 101. As described in more detail below, each of the actuating units 12 comprises a slant surface portion 121 and a cover portion 122 for shielding the first electrical end.

Figure 4:
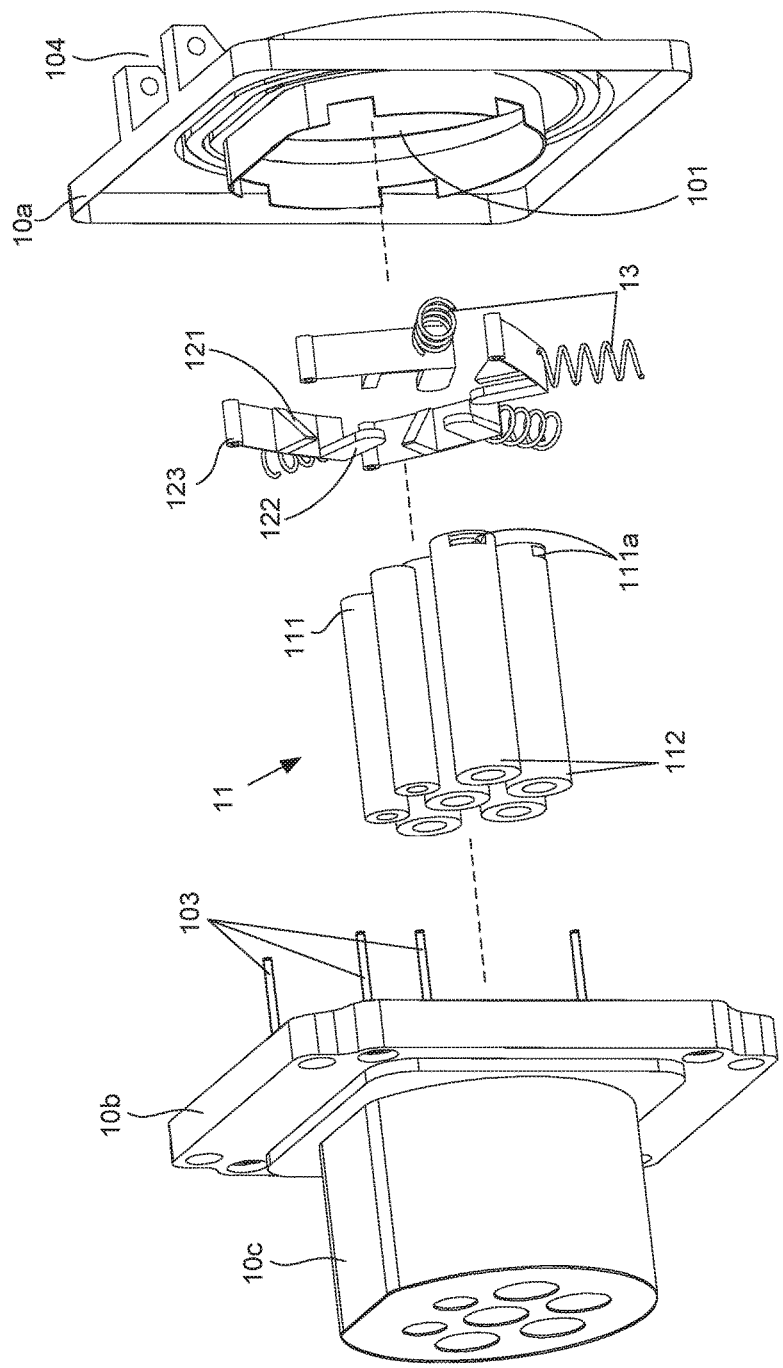
FIG. 4 shows an exploded view of the industrial socket.

Continuously referring to FIG. 2 and FIG. 3, and please simultaneously refer to FIG. 4, which shows an exploded view of the industrial socket. As show in FIG. 2, FIG. 3, and FIG. 4, the industrial socket 1 of the present invention further comprises a plurality of elastic elements 13, which are disposed in the insulation body 10 and are located between the inner wall of the accommodating space and one corresponding actuating unit 12. It is worth explaining that, when an electrical plug 2 is inserted into the receiving opening 101, the slant surface portion 121 enters the corresponding notch 102 by a pushing force applied by the electrical plug 2, so as to stop the shielding to the first electrical end of the electrical connectors 11. As a result, a plurality of electrical terminals of the electrical plug 2 are respectively electrically connected to the first electrical ends of the electrical connectors 11. According to particular design of the present invention, some of the electrical connectors 11 are provided with a sidewall aperture 111a on the first electrical end thereof, such that each of the cover portion 122 shields the corresponding first electrical end by inserting into the corresponding sidewall aperture 111a.

Please refer to FIG. 2, FIG. 3, and FIG. 4 again. The industrial socket 1 of the present invention further comprises: a front cover frame 10a, a base 10b, a sheath member 10c, and a plurality of connecting rods 103. From FIG. 2, FIG. 3 and FIG. 4, it is understood that the aforesaid insulation body 10 is constituted by the front cover frame 10a, the accommodating space and the base 10b, wherein the front cover frame 10a is connected to the front side of the accommodating space so as to make the receiving opening 101 be located in the front cover frame 10a. On the other hand, the base 10b is connected to the rear side of the accommodating space, and the sheath member 10c is connected to the bottom of the base 10b. In addition, FIG. 4 also depicts that each of the plurality of electrical connectors 11 has a second electrical end 112, and the second electrical ends 112 protrude out of the base 10b so as to be accommodated by the sheath member 10c. As explained in more detail below, the connecting rods 103 are disposed between the front cover frame 10a and the base 10b. Moreover, each of the actuality units 12 has a pivot member 123, such that each of the plurality of actuality unit 12 is positioned around the receiving opening 101 by connecting the pivot member 123 with the connecting rod 103.

It is needs to specifically explain that, although FIG. 2 and FIG. 3 show that the both the front cover frame 10a and the base 10b have a square appearance, the shape or appearance of these two articles does not be hence limited to be square or rectangular. For example, the shape of the front cover frame 10a and/or the base 10b can be round or triangular. The most important thing is that, in the case of meeting the requirements of International Electrotechnical Commission (IEC) standards, Society of Automotive Engineers (SAE) Standards, and Guobiao (GB) standards, this industrial socket 1 can be processed to various commercial industrial socket. The demonstrative sockets of the industrial socket are listed in following Table I. In other words, the industrial socket of the present invention is suitable for International Electrotechnical Commission (IEC) standards, Society of Automotive Engineers (SAE) Standards, and Guobiao (GB) standards.

TABLE I

| Industrial standard | Voltage | Current |
| --- | --- | --- |
| IEC 62196-2 type2 | 480 V (Three phase) | 63A (Three phase) 70A (Single phase) |
| SAE J1772 (IEC 62196-2 type1) | 250 V (Single phase) | 80A (Single phase) |
| GB/T 20234.4-2011 | 440 V (Three phase) | 32A |

Figure 5:
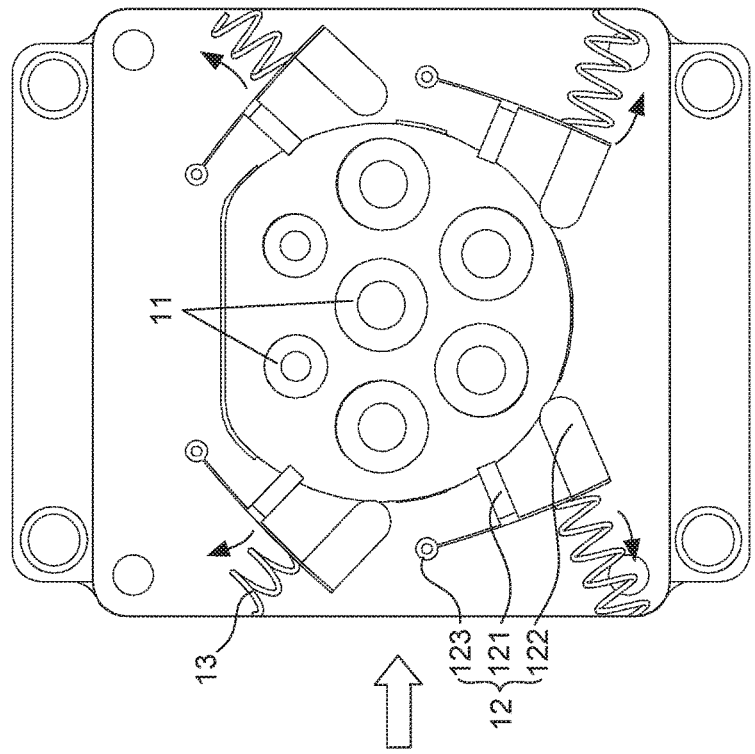
FIG. 5 shows a top view of the industrial socket for detailedly describing the action of actuating units.
Figure 5:
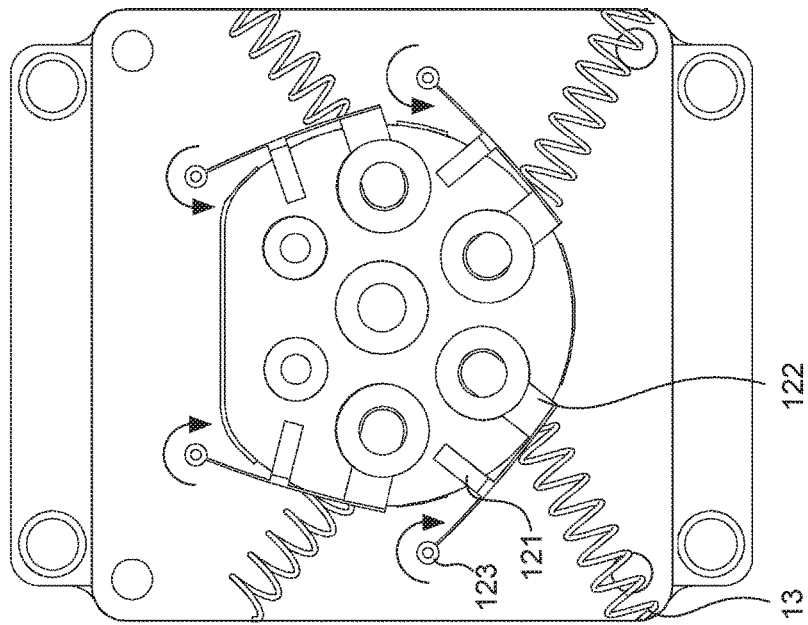
Figure 6A:
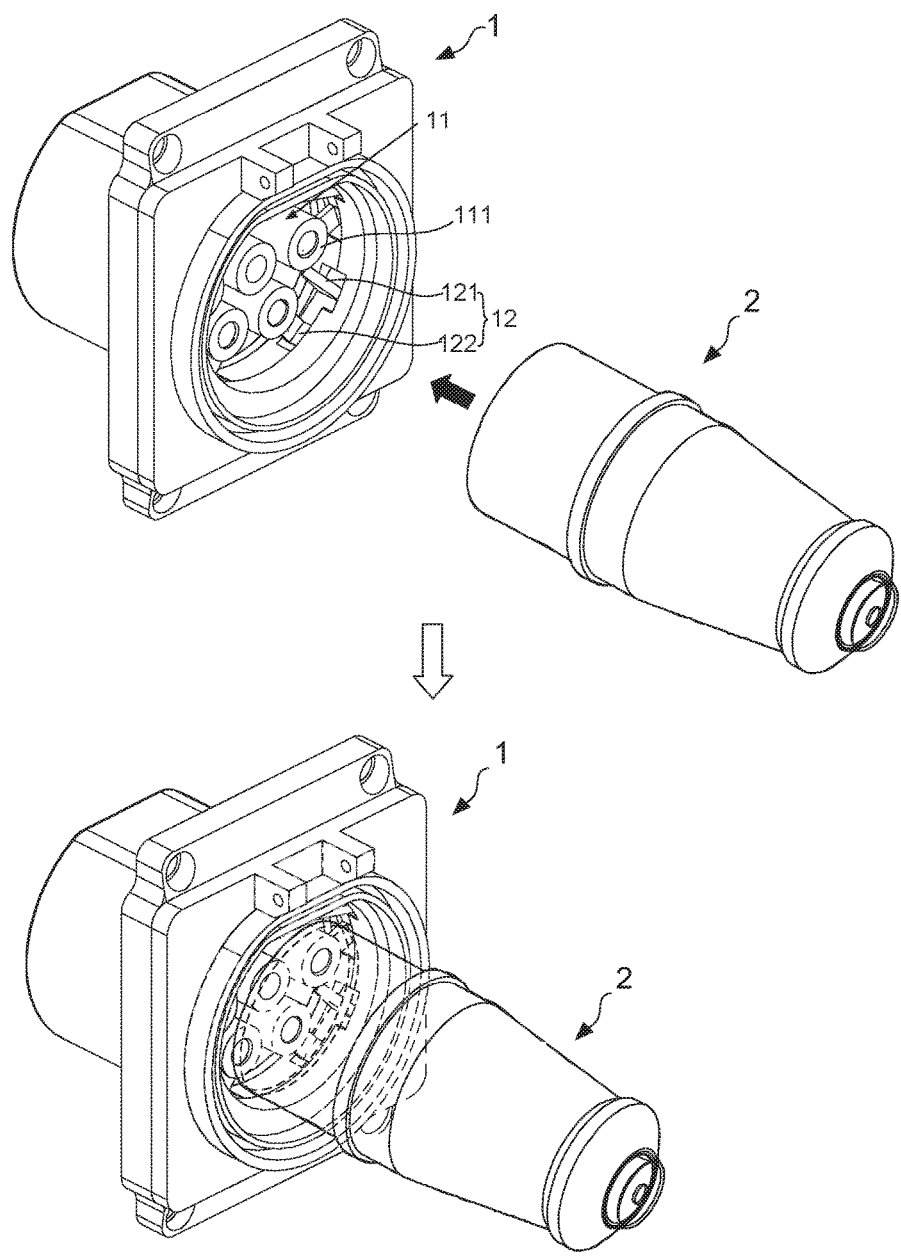
FIG. 6A shows a stereo view of the industrial socket for describing the combination of the industrial socket and an electrical plug.
Figure 6B:
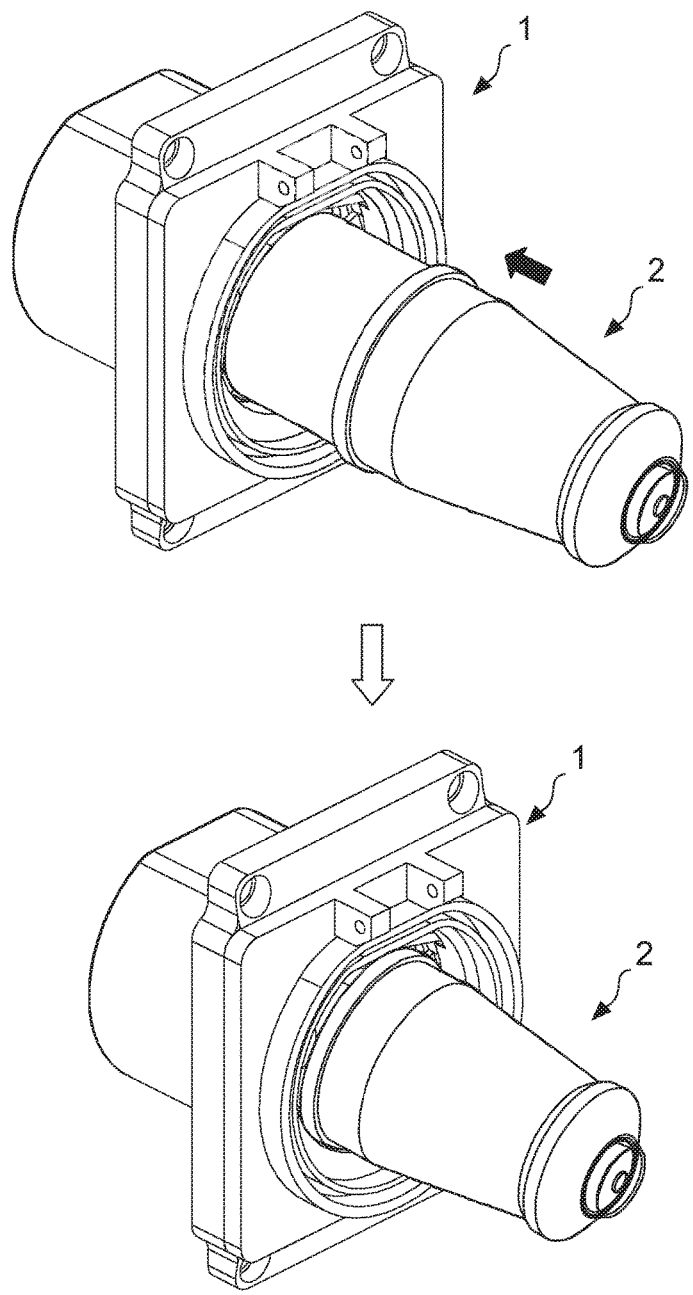
FIG. 6B shows a stereo view of the industrial socket for describing the combination of the industrial socket and the electrical plug.

Referring to FIG. 4 again, and please simultaneously refer to FIG. 5, which shows a top of the industrial socket for detailedly describing the action of actuating units. Please simultaneously refer to FIG. 6A and FIG. 6B, wherein both the FIG. 6A and FIG. 6B shows a stereo view of the industrial socket for describing the combination of the industrial socket and an electrical plug. According to the particular design of the present invention, when there are no external forces being applied to the industrial socket 1, each of the plurality of cover portion 122 protrude out of the sidewall aperture 111a of the accommodating space after being applied with corresponding release force of each of the plurality of elastic elements 13. As a result, the cover portion 122 is positioned to shield the first electrical end of the electrical connectors 11 for achieving dustproof and protection of contact terminal of the electrical connectors 11. On the contrary, when an electrical plug 2 is inserted into the receiving opening 101 of the accommodating space of the insulation body 10, each of the plurality of slant surface portions 101 enter the corresponding notch thereof by a pushing force applied by the electrical plug 2. More particularly, each of the plurality of actuating units 12 moves rotationally by taking the pivot member 123 as an axle center after the pushing force of the electrical plug 2 is applied to the slant surface portion 121, such that the cover portion 122 correspondingly moves with the motion of the slant surface portion 121, so as to stop the shielding to an electrical end of the electrical connector 11. Furthermore, when the electrical plug 2 is moved away from the industrial socket 1, the cover portion 122 by the elastic force of the elastic elements 13 restored to the position, which shielded to the first electrical end 111. It is worth explaining that, the propose of the industrial socket 1 is used in an electric vehicle or a straddle-type electric vehicle.

Figure 7A:
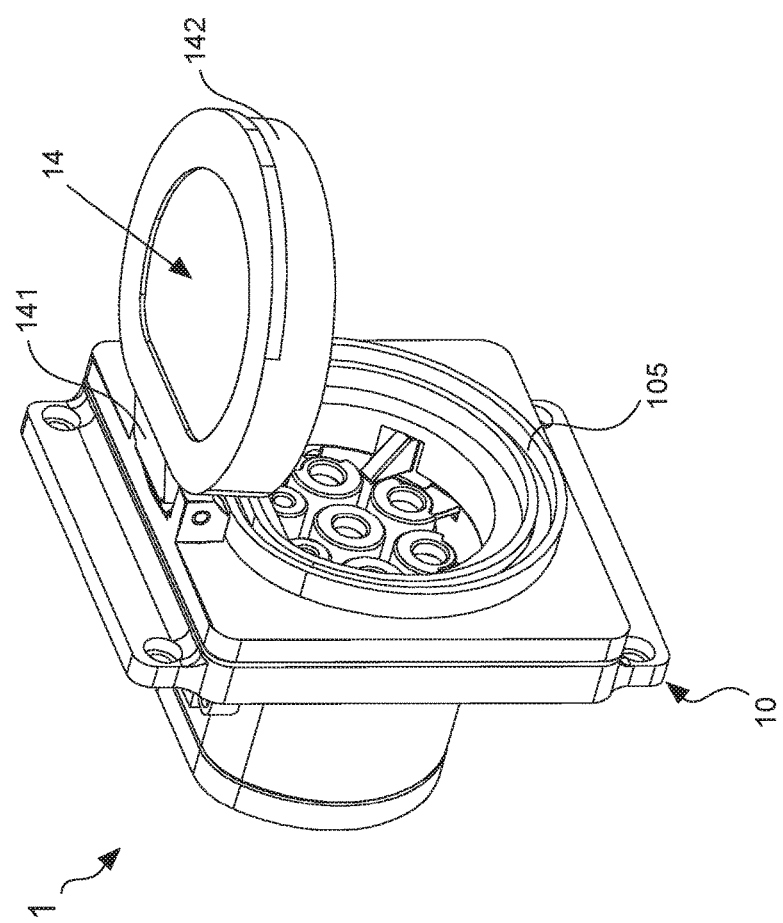
FIG. 7A shows a stereo diagram of the industrial socket provided with an outer lid.
Figure 7B:
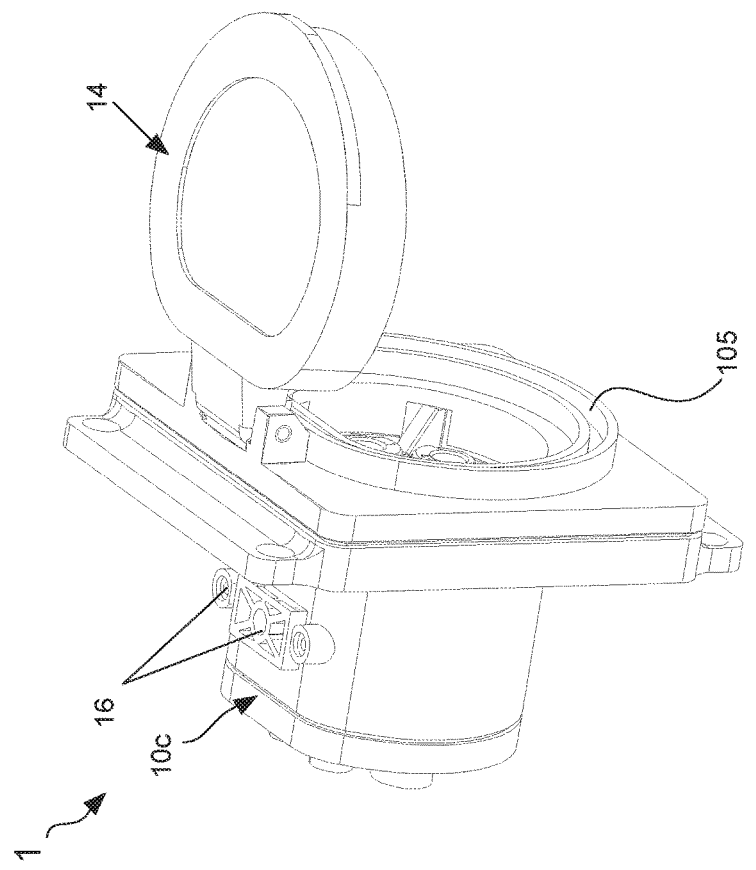
FIG. 7B shows a stereo diagram of the industrial socket having the outer lid.

Please refer to FIG. 7A and FIG. 7B, which both show a stereo diagram of the industrial socket provided with an outer lid. As show in FIG. 7A and FIG. 7B, the front cover frame 10a is provided with a pivot structure 104 thereon, and an engaging portion 105 is formed on near the receiving opening 101. Moreover, the industrial socket 1 of the present invention further comprises an outer lid 14 and at least one of torsion spring, wherein the outer lid 14 has a pivot portion 141 and a flange 142. From FIG. 7 and FIG. 7B, it can know that the pivot portion 141 is pivotally disposed to the pivot structure 104, and the flange 142 is engaged with the engaging portion 105. Moreover, a fixing portion 16 is formed on one side of the sheath member 10c.

Through above descriptions, the industrial socket 1 of the present invention has been introduced completely and clearly; in summary, the present invention includes the advantages of:

(1) The present invention discloses an industrial socket 1, comprising: an insulation body 10, a plurality of electrical connectors 11, a plurality of actuating units 12, and a plurality of elastic elements 13, wherein each of the plurality actuating units 12 comprises a slant surface portion 121 and a cover portion 122. Moreover, the insulation body 10 has an accommodating space with a receiving opening 101 and a plurality of notch 102 formed on the inner wall of the accommodating space, and each of the electrical connectors 11 has a sidewall aperture 111a. It is worth explaining that, when there are no external forces being applied to the industrial socket 1, each of the plurality of cover portions 122 are configured to protrude out of the corresponding sidewall aperture 111a thereof, so as to be positioned to shield a first electrical end of each of the plurality of electrical connectors 11. On the contrary, when an electrical plug 2 is inserted into the receiving opening 101 of the insulation body 10, each of the plurality of slant surface portions 121 enters the corresponding notch 102 in the accommodating space by a pushing force applied by the electrical plug 2, such that the cover portion 122 correspondingly moves with the motion of the slant surface portion 121, so as to stop the shielding to the first electrical end of the electrical connector 11. Therefore, this novel industrial socket 1 has many outstanding functions of fool-proof, dustproof and contact protection.

(2) It is worth explaining that, because all of the actuating units 12 are individually disposed in the insulation body 10, an unsuitable, an off-standard or a non-standard electrical plug would be blocked from achieving electrical connection with the electrical connectors in the insulation body 10 due to the fact that the off-standard electrical plug fails to make each of the plurality of cover portions 122 stop the shielding of the first electrical end of each of the plurality of electrical connectors 11. Briefly speaking, this industrial socket 1 is also particularly designed to have a fool-proofing function, such that the industrial socket 1 is prevented from causing an electric shock to users or being damaged by the insertion of those unsuitable electrical plugs.

The above description is made on embodiments of the present invention. However, the embodiments are not intended to limit scope of the present invention, and all equivalent implementations or alterations within the spirit of the present invention still fall within the scope of the present invention.

What is claimed is:

1. An industrial socket, comprising:
   an insulation body, having an accommodating space with a receiving opening and a plurality of notch formed on the inner wall of the accommodating space;
   a plurality of electrical connectors, being disposed in the accommodating space and having a first electrical end;
   a plurality of actuating units, being pivotally connected to the inner wall of the accommodating space and positioned around the receiving opening; wherein each of the actuating units comprises a slant surface portion and a cover portion, and the cover portion shielding the first electrical end; and
   a plurality of elastic elements, being disposed in the insulation body, wherein each of the plurality of elastic elements is located between the inner wall of case and one corresponding actuating unit;
   wherein, when an electrical plug is inserted into the receiving opening, the slant surface portion enters the corresponding notch by a pushing force applied by the electrical plug, such that the cover portion correspondingly moves with the motion of the slant surface portion, so as to stop the shielding to the first electrical end of the electrical connectors, therefore a plurality of electrical terminals of the electrical plug are respectively electrically connected to the first electrical ends of the electrical connectors.

2. The industrial socket of claim 1, wherein some of the electrical connectors are provided with a sidewall aperture on the first electrical end thereof, such that each of the cover portion shields the corresponding first electrical end by inserting into the corresponding sidewall aperture.

3. The industrial socket of claim 1, further comprising:
   a front cover frame, being connected to the front side of the accommodating space, and the receiving opening being located in the front cover frame; and
   a base, being connected to the rear side of the accommodating space;
   a sheath member, being connected to the bottom of the base; and
   a plurality of connecting rods, being disposed between the front cover frame and the base;
   wherein, the insulation body is constituted by the front cover frame, the accommodating space and the base;
   wherein each of the plurality of electrical connectors has a second electrical end, and the second electrical ends protruding out of the base and being accommodated by the sheath member.

4. The industrial socket of claim 3, wherein each of the actuality units has a pivot member, and the actuality unit being positioned around the receiving opening by connecting the pivot member and the connecting rods.

5. The industrial socket of claim 3, wherein the front cover frame is provided with a pivot structure thereon.

6. The industrial socket of claim 5, wherein an engaging portion is formed on near the receiving opening.

7. The industrial socket of claim 6, further comprising:
   an outer lid, having a pivot portion and a flange; and
   at least one of torsion spring, being disposed on the pivot portion;
   wherein, the pivot portion is pivotally disposed to the pivot structure, and the flange is engaged with the engaging portion.

8. The industrial socket of claim 3, wherein a fixing portion is formed on one side of the sheath member.

9. The industrial socket of claim 1, being used in an electric vehicle.

10. The industrial socket of claim 1, being used in a straddle-type electric vehicle.

* * * * *